US012715559B2

(12) United States Patent
Utsunomiya et al.

(10) Patent No.: US 12,715,559 B2
(45) Date of Patent: Aug. 25, 2026

(54) METHOD FOR RAISING FLOATING BODY FOR SPAR-TYPE OFFSHORE WIND POWER GENERATION FACILITY

(71) Applicants: TODA CORPORATION, Tokyo (JP); KYUSHU UNIVERSITY, NATIONAL UNIVERSITY CORPORATION, Fukuoka (JP)

(72) Inventors: Tomoaki Utsunomiya, Fukuoka (JP); Iku Sato, Tokyo (JP); Kouji Tanaka, Tokyo (JP); Yasuhiro Shinkawa, Tokyo (JP); Kenta Sakai, Tokyo (JP)

(73) Assignees: TODA CORPORATION, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 455 days.

(21) Appl. No.: 18/283,082

(22) PCT Filed: Mar. 25, 2022

(86) PCT No.: PCT/JP2022/014408
§ 371 (c)(1),
(2) Date: Sep. 20, 2023

(87) PCT Pub. No.: WO2022/210358
PCT Pub. Date: Oct. 6, 2022

(65) Prior Publication Data

US 2024/0166313 A1 May 23, 2024

(30) Foreign Application Priority Data

Mar. 29, 2021 (JP) ................................ 2021-054613

(51) Int. Cl.
*B63B 39/03* (2006.01)
*B63B 35/44* (2006.01)
(Continued)

(52) U.S. Cl.
CPC .............. *B63B 39/03* (2013.01); *B63B 35/44* (2013.01); *B63B 77/10* (2020.01); *F03D 13/256* (2023.08);
(Continued)

(58) Field of Classification Search
CPC ......... B63B 39/00; B63B 39/03; B63B 35/00; B63B 35/44; B63B 2035/442;
(Continued)

(56) References Cited

U.S. PATENT DOCUMENTS 3,921,558 A * 11/1975 Redshaw ............ E21B 43/0122 441/32
6,012,873 A * 1/2000 Copple ................ B63B 21/502 405/207
(Continued)

FOREIGN PATENT DOCUMENTS

JP 2010223113 A * 10/2010 ............ B63B 77/10

OTHER PUBLICATIONS

Detailed Description of JP 2010-223113 A (Machine Translation to English from J-PlatPat website) (Year: 2010).*

*Primary Examiner* — Daniel V Venne
(74) *Attorney, Agent, or Firm* — Wenderoth, Lind & Ponack, L.L.P.

(57) ABSTRACT

A floating body (4) for a spar-type offshore wind power generation facility floating sideways is raised by injecting ballast water at sea, by steps including a first step of decentering a center of gravity of the floating body for the spar-type offshore wind power generation facility by means of a center-of-gravity decentering device, and a second step of injecting the ballast water to raise upright the floating body for the spar-type offshore wind power generation facility. The center-of-gravity decentering device may be a
(Continued)

weight (2) attached to an outer surface of the floating body, or a solid ballast (34) introduced in the floating body.

2 Claims, 13 Drawing Sheets

(51) Int. Cl.
*B63B 77/10* (2020.01)
*F03D 13/25* (2016.01)

(52) U.S. Cl.
CPC ..... *B63B 2035/446* (2013.01); *F05B 2240/93* (2013.01); *F05B 2240/95* (2013.01)

(58) Field of Classification Search
CPC ... B63B 2035/446; B63B 77/10; B63B 1/047; F05B 2240/93; F05B 2240/95; F03D 13/126; F03D 13/256; Y02E 10/727
USPC .......................................................... 114/121
See application file for complete search history.

(56) References Cited

U.S. PATENT DOCUMENTS 6,092,483 A * 7/2000 Allen ...................... B63B 1/048 441/28
6,227,137 B1 * 5/2001 Allen .................. B63B 35/4406 114/264
6,263,824 B1 * 7/2001 Balint ................ B63B 35/4406 114/264
7,197,999 B2 * 4/2007 Murray ............... B63B 35/4413 114/264
7,377,225 B2 * 5/2008 Finn .................... B63B 35/4406 114/264
8,047,151 B2 * 11/2011 Foo ......................... B63B 21/50 114/230.2
9,457,873 B2 * 10/2016 Nagurny ................. B63B 35/44
9,777,713 B2 * 10/2017 Sato ........................ F03D 13/10

* cited by examiner

【Fig. 1】
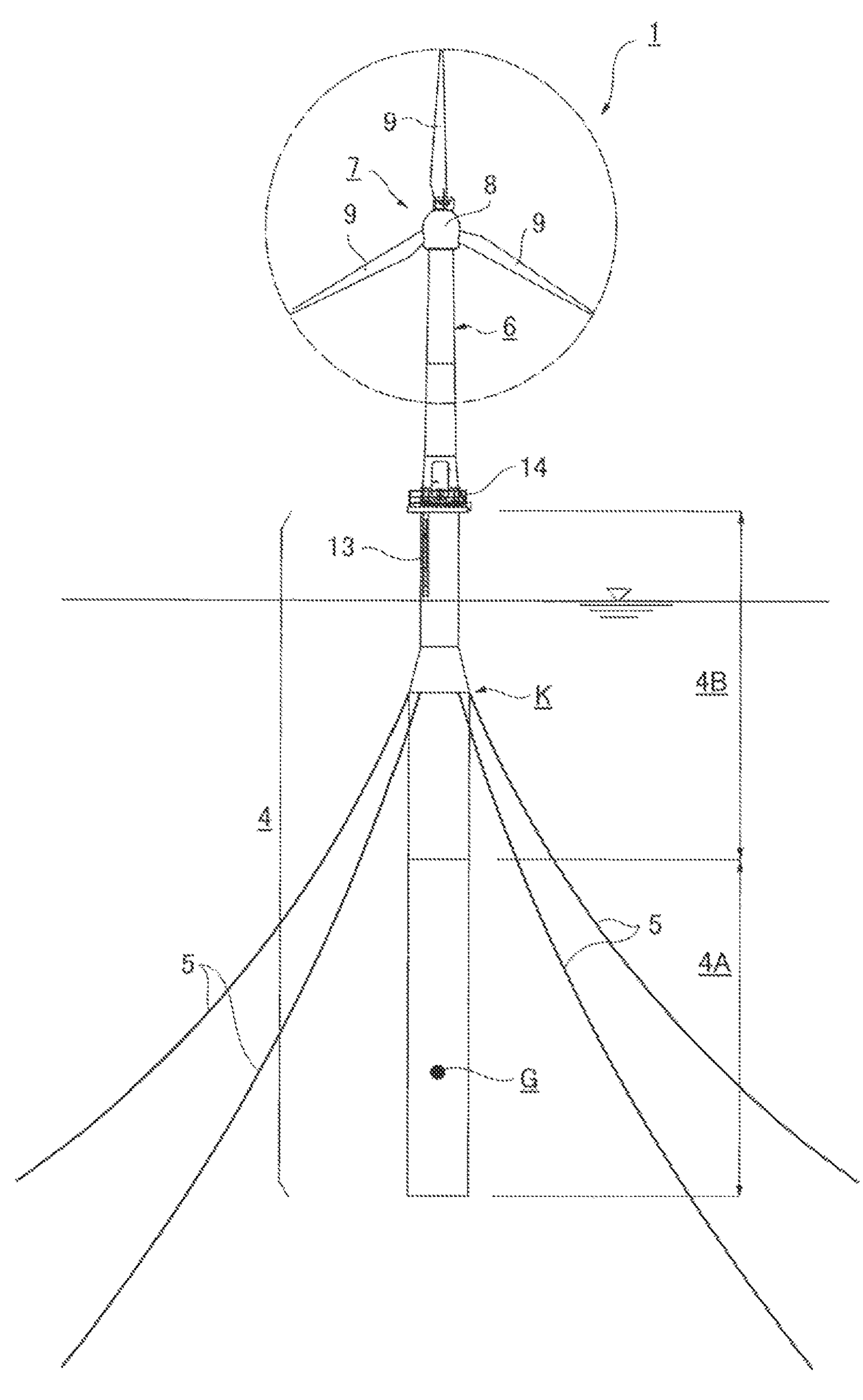

【Fig. 2】
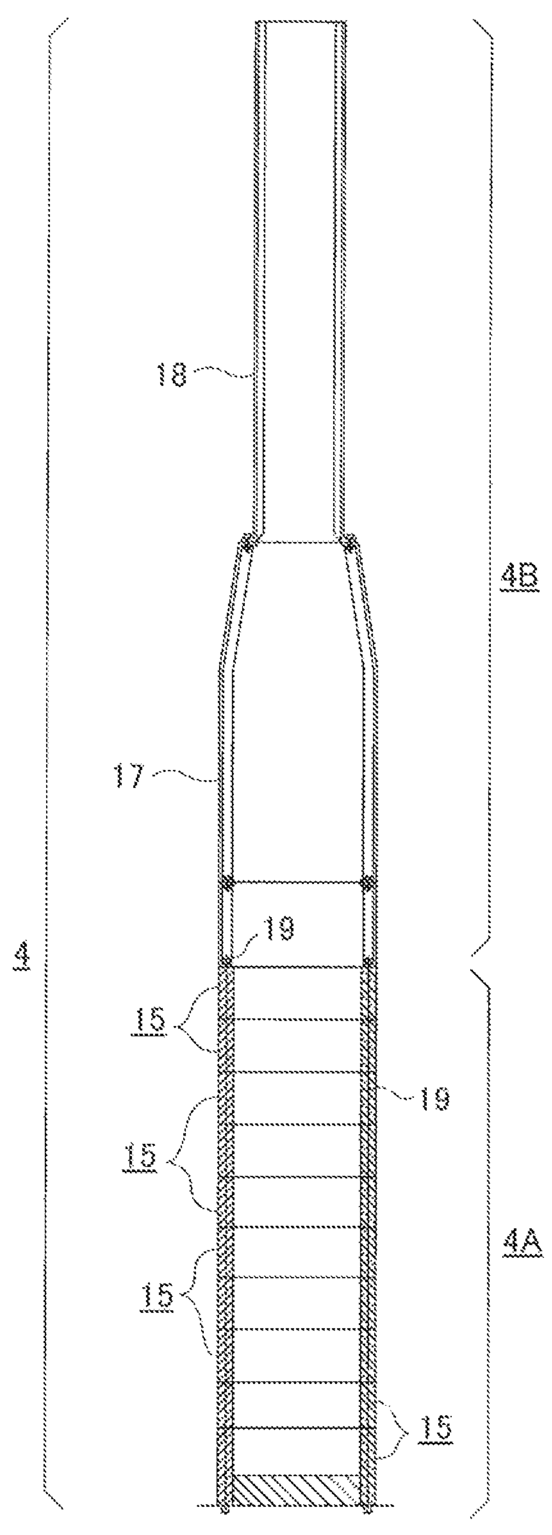

【Fig. 3】
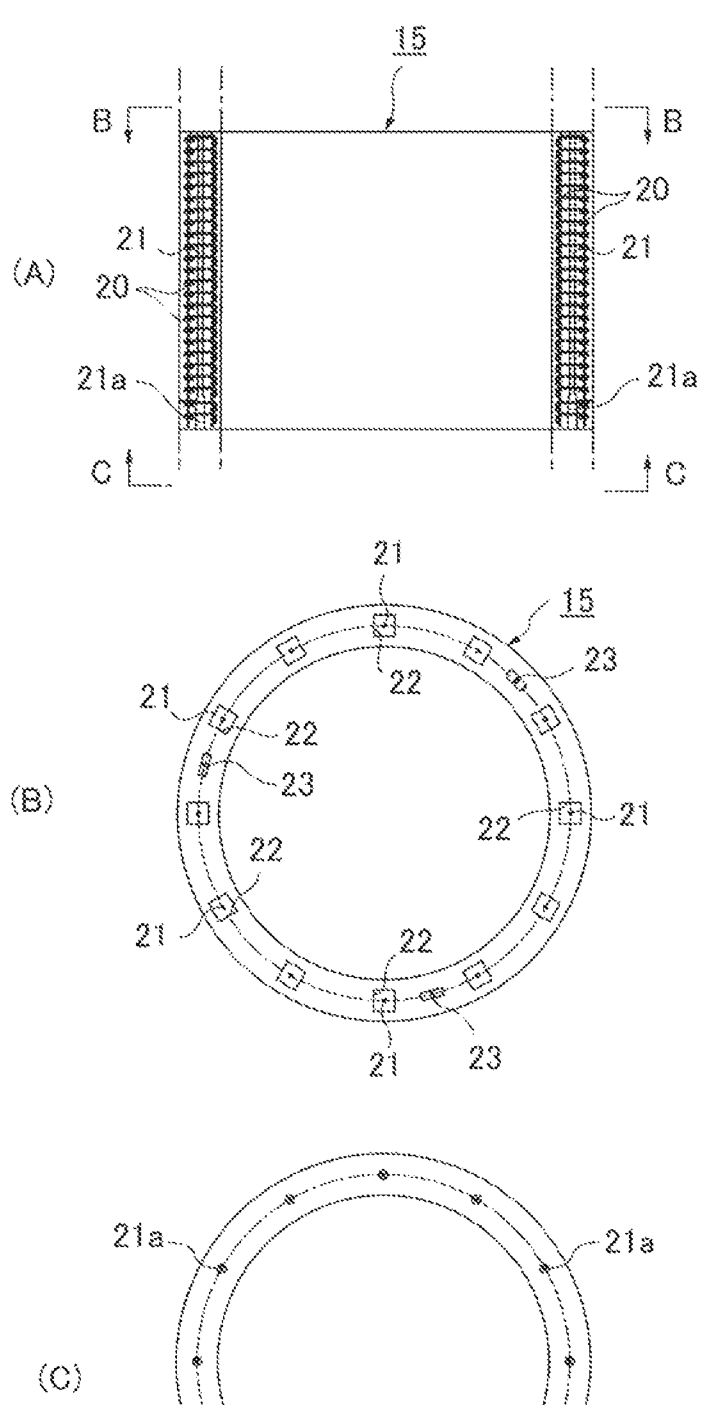

【Fig. 4】
(A)
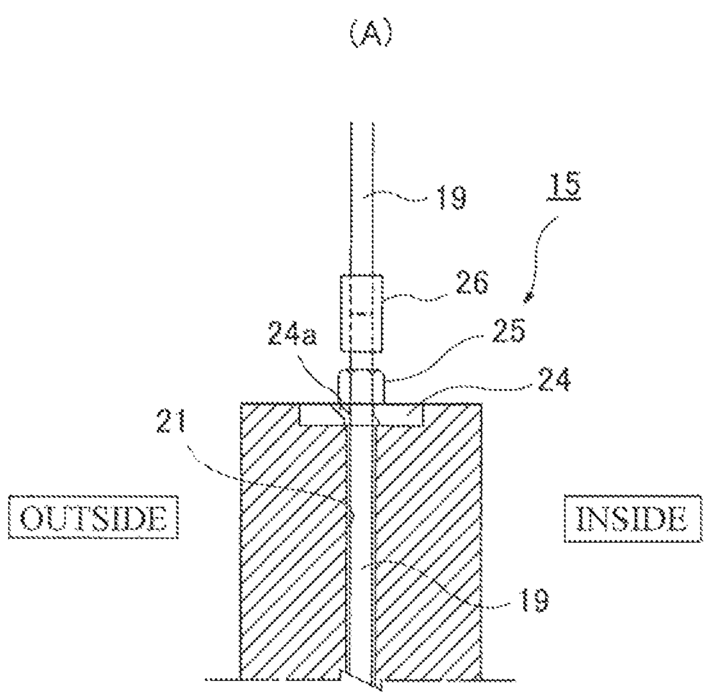
(B)
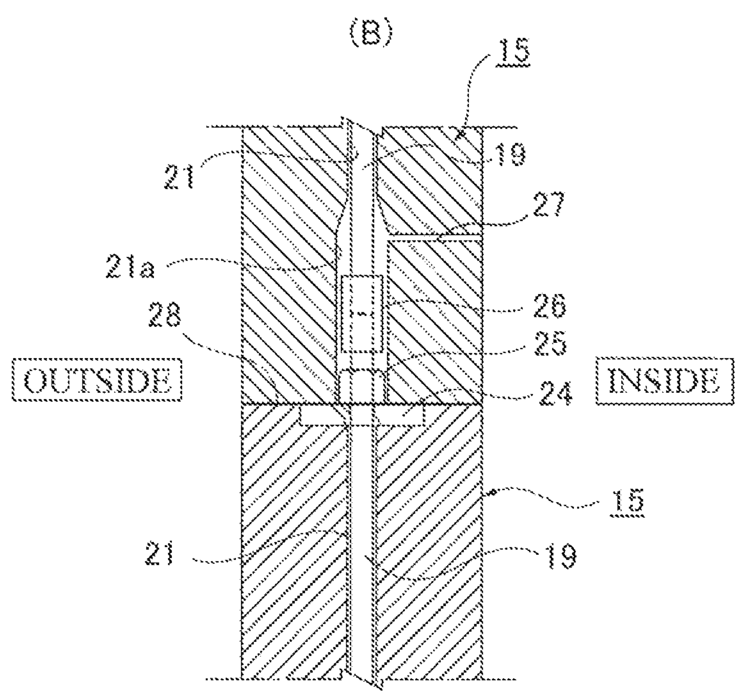

【Fig. 6】
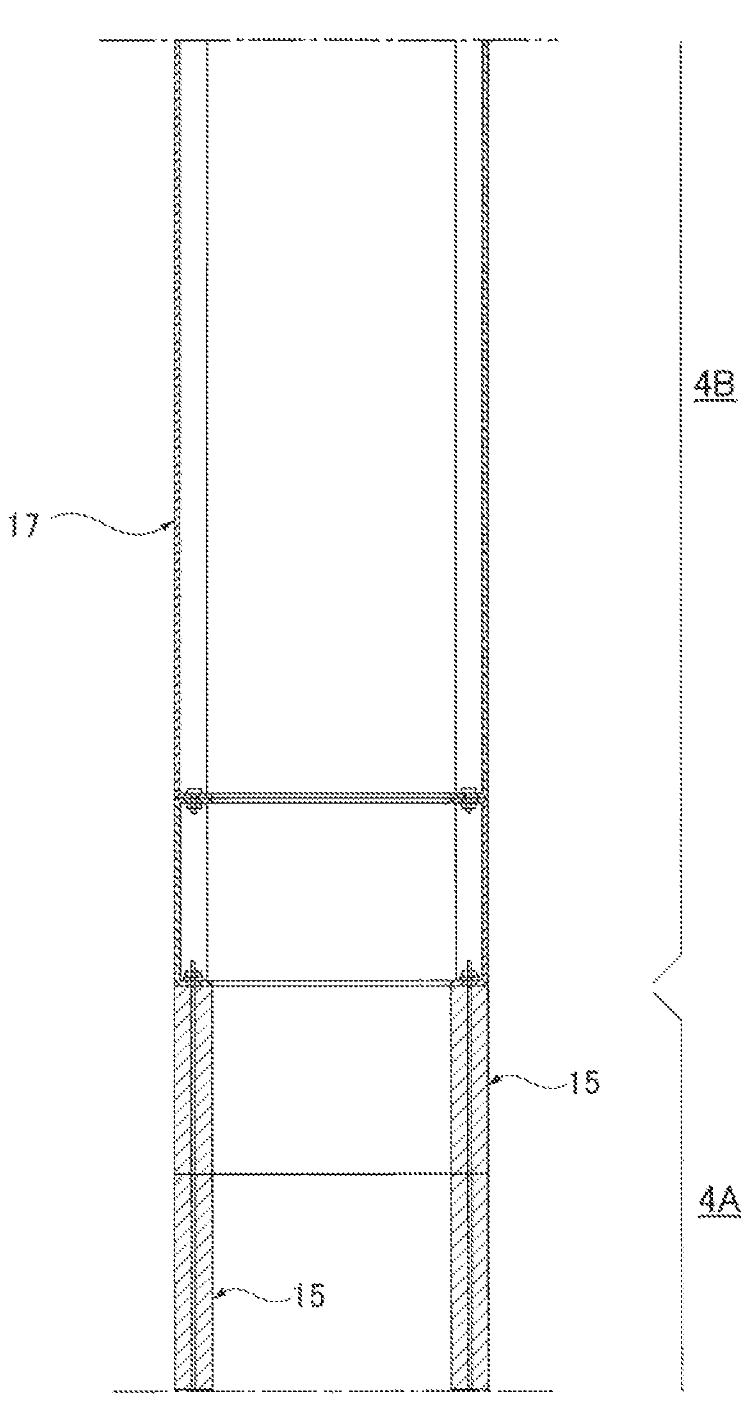

【Fig. 6】
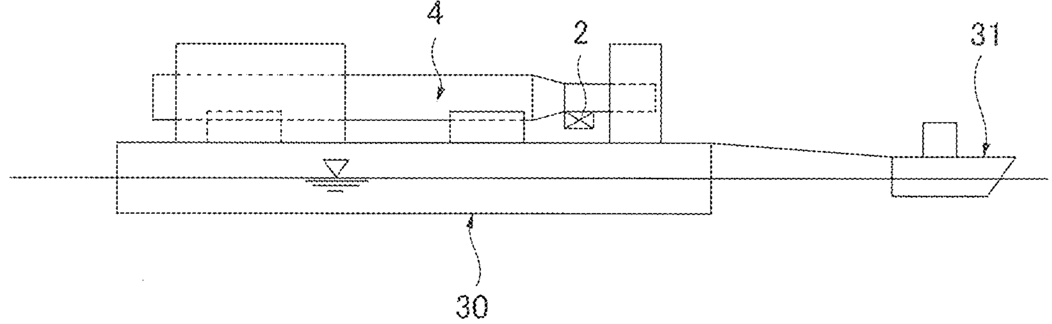
【Fig. 7】
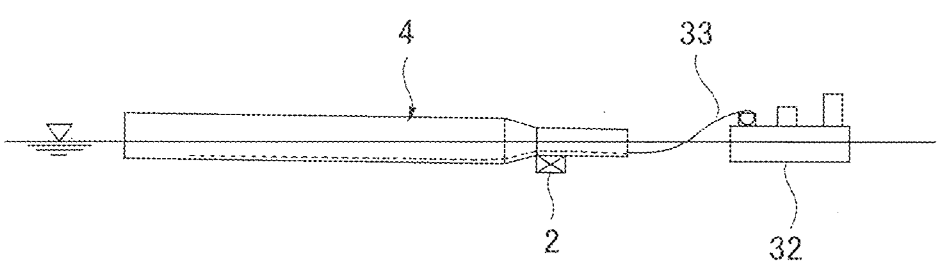

【Fig. 8】
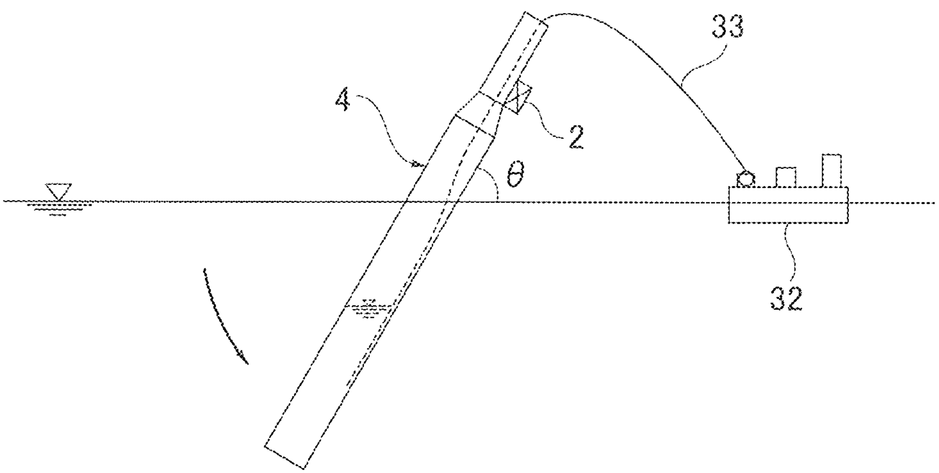
【Fig. 9】
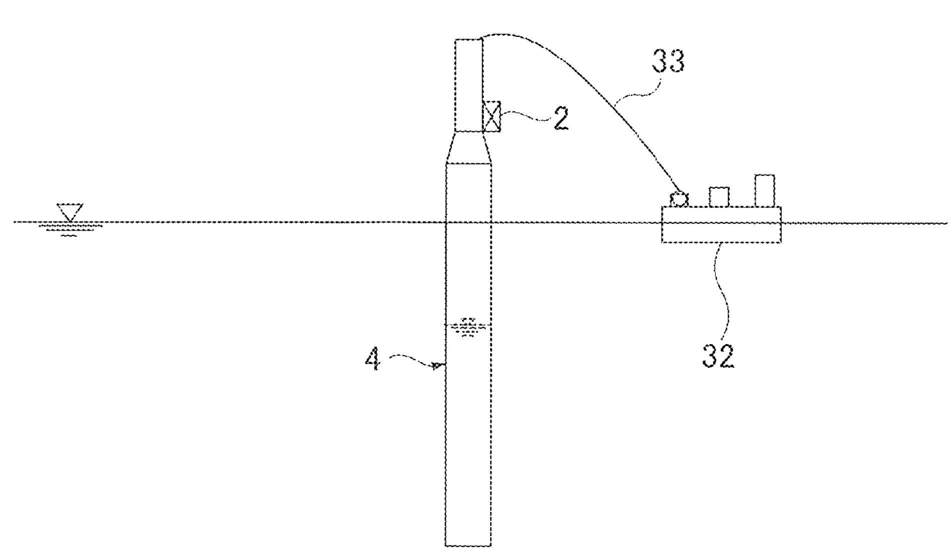

【Fig. 10】
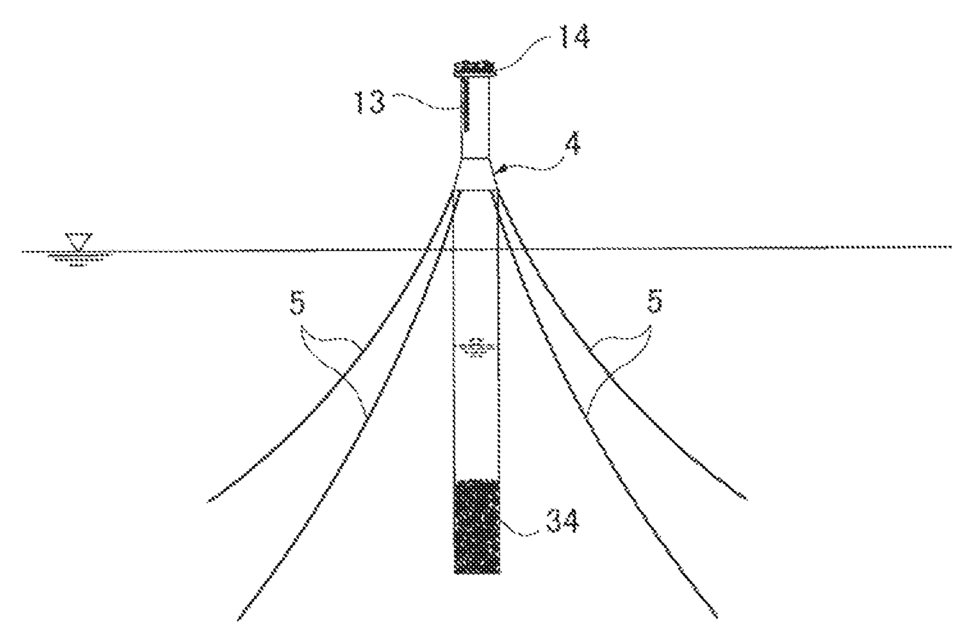

【Fig. 11】
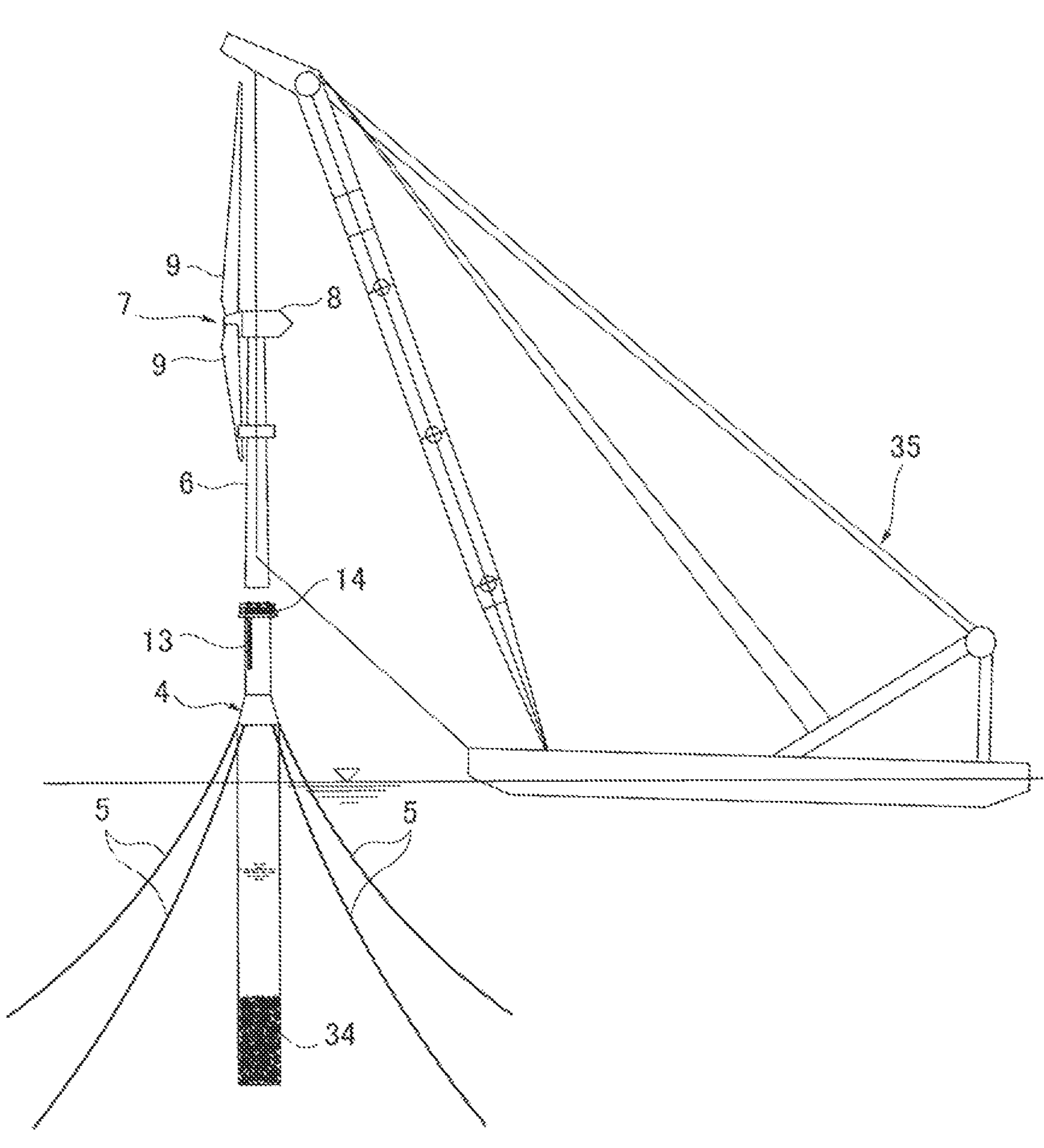

【Fig. 12】
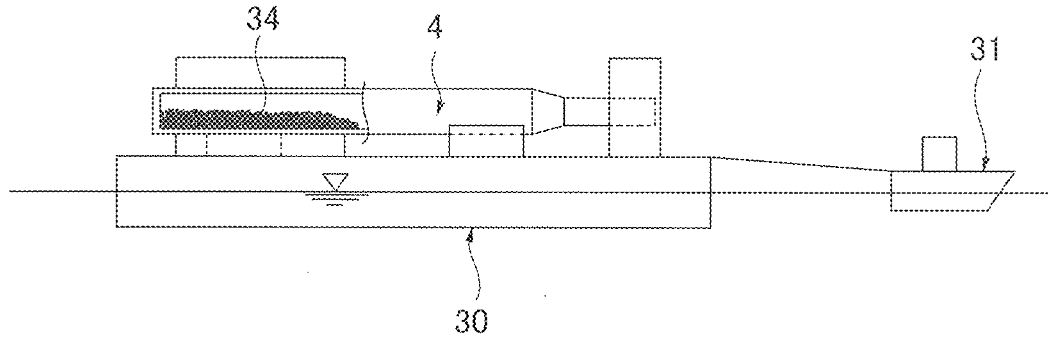
【Fig. 13】
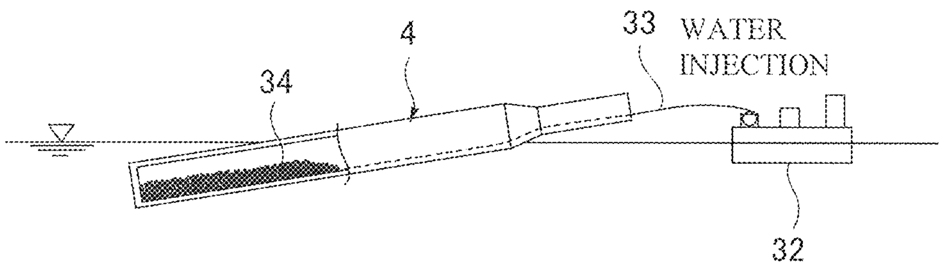

【Fig. 14】
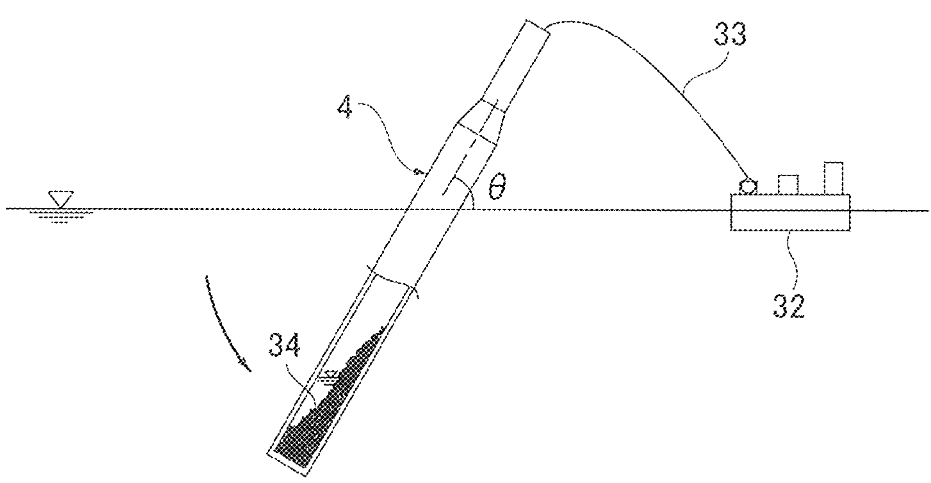
【Fig. 15】
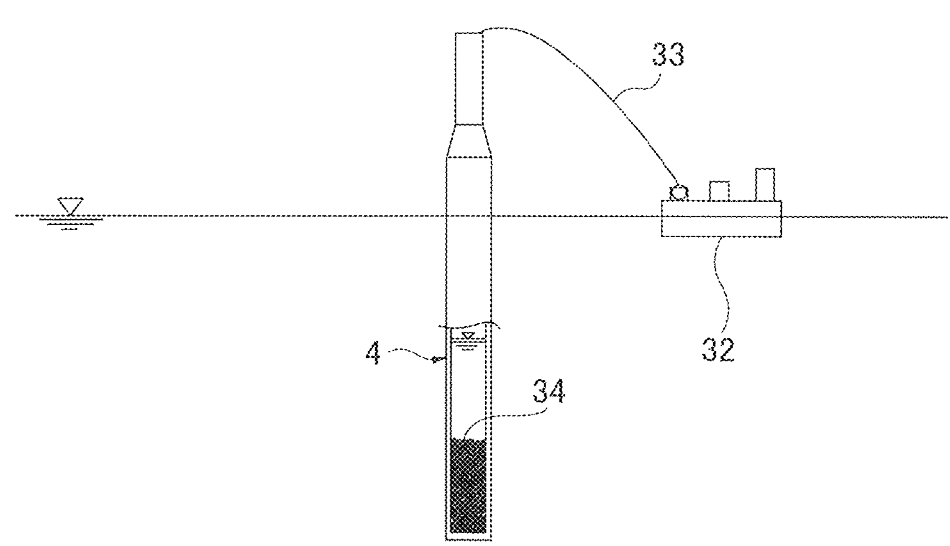

【Fig. 16】
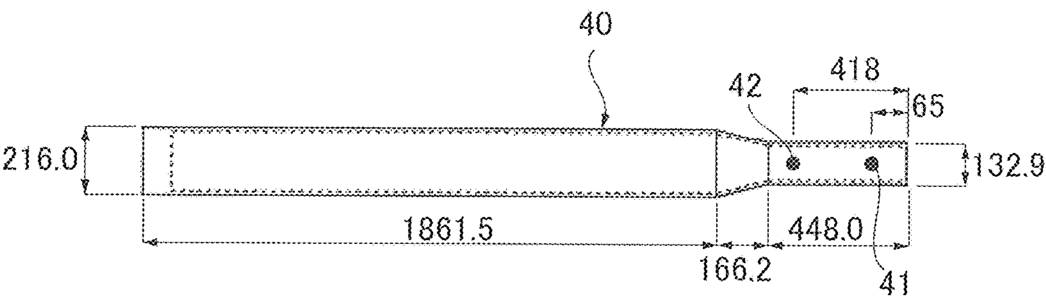
【Fig. 17】
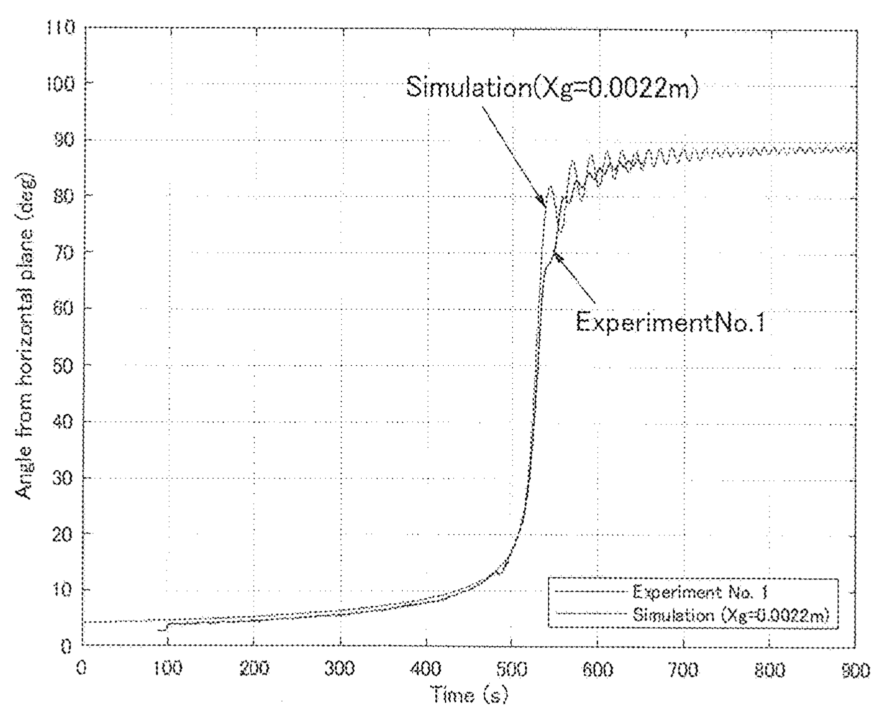

【Fig. 18】
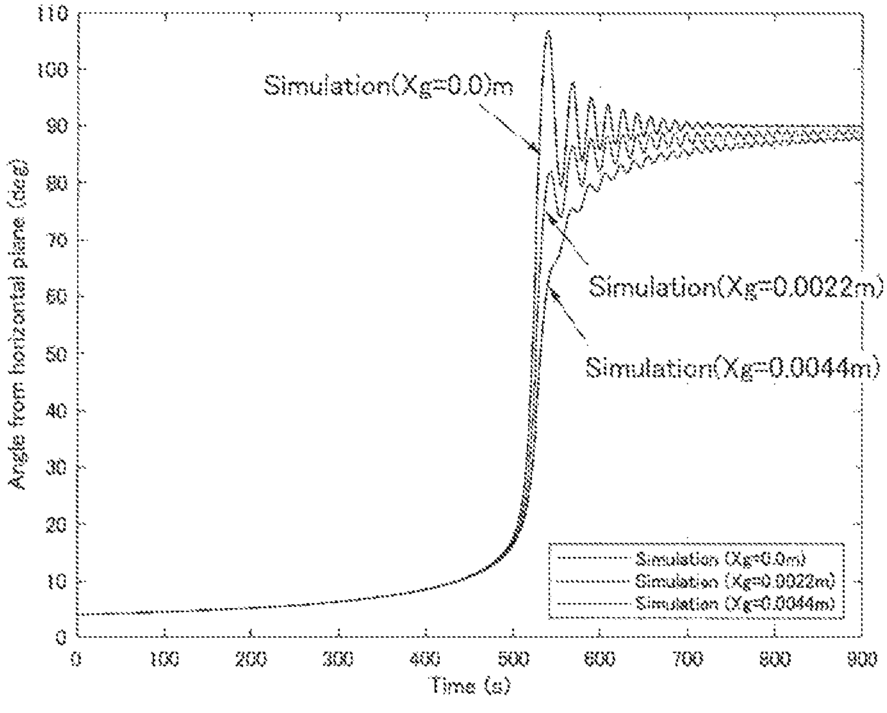

METHOD FOR RAISING FLOATING BODY FOR SPAR-TYPE OFFSHORE WIND POWER GENERATION FACILITY

TECHNICAL FIELD

The present invention relates to a method for raising a floating body for a spar-type offshore wind power generation facility with respect to a floating body to be installed at sea in a relatively deep water area.

BACKGROUND ART

In an example, Patent Document 1 to be described below discloses an offshore wind power generation facility configured with a floating body, a mooring cable, a tower, a nacelle installed at the top of the tower, and a plurality of blades. The floating body is a spar-type floating structure, which includes a lower concrete floating structure formed by stacking a plurality of concrete precast cylindrical bodies in the height direction, and tightly connecting and integrating them with PC steel members, and an upper steel floating structure connected above the lower concrete floating structure. The "spar-type" herein refers to a cylindrical floating structure formed in a long slender shape like a bar-type fishing float.

In the case where the spar-type offshore wind power generation facility is installed at sea, the facility is preferably constructed in a calm bay. However, the draft (submerged part) of the floating body is deep, approx. 70 meters or more, while a water depth in a bay is generally shallower than the depth above. Accordingly, the construction in a bay is difficult. For this reason, in the case where the spar-type offshore wind power generation facility is installed, as disclosed in Patent Document 2, the floating body is either floated sideways at sea close to a construction yard and towed to an installation site by a tugboat, or mounted on a barge and towed to the installation site. The floating body is thereafter slowly raised upright, by injecting ballast water, and gradually delivering from a winch the wire attached to the bottom of the floating body.

CITATION LIST

Patent Literature

[Patent Document 1] Japanese Patent Publication No. 5274329

[Patent Document 2] Japanese Patent Application Laid-Open Publication No. 2012-201219

SUMMARY OF INVENTION

Technical Problem

The floating body is raised upright by assisting the body by means of the wire delivered from the winch, so as to prevent the floating body from rapidly rising upright at a certain point during when the ballast water is injected. The inertial force of the floating body causes swaying (vibration) when the floating body is brought into the upright state, whereby the floating body or its associated facility may be damaged. Therefore, the work of raising a floating body at sea is dangerous, and requires utmost caution and carefulness.

The major purpose of the present invention is to provide a method for safely and efficiently raising a floating body for a spar-type offshore wind power generation facility upright by injecting ballast water at sea.

Solution to Problem

In order to solve the problem above, a first aspect of the invention provides a method for raising a floating body for a spar-type offshore wind power generation facility, which is performed to raise the floating body for the spar-type offshore wind power generation facility from a floating sideways position to an upright position by injecting ballast water at sea, including

- a first step of decentering a center of gravity of the floating body for the spar-type offshore wind power generation facility by means of a center-of-gravity decentering means, and
- a second step of injecting the ballast water to raise the floating body for the spar-type offshore wind power generation facility to the upright position.

The first aspect of the invention is a first embodied raising method according to the present invention. Specifically, the floating body is raised upright by, in the first step, beforehand decentering the center of gravity of the floating body for the spar-type offshore wind power generation facility by means of the center-of-gravity decentering means. As will be described later in the Example, the beforehand decentering of the center of gravity slows the rising motion to which the floating body is shifted from the state of floating sideways by injecting the ballast water, and further reduces swaying in size of the floating body after becoming close to the upright state. The "decentering of the center of gravity" herein means the shift of the center of gravity of the floating body not only in the direction along the longitudinal central axis of the floating body but also in the plane direction perpendicular to the longitudinal central axis of the floating body.

Accordingly, the present invention enables to safely and efficiently raise upright the floating body for the spar-type offshore wind power generation facility by injecting the ballast water at sea.

A second aspect of the invention provides a method for raising a floating body for a spar-type offshore wind power generation facility, which is performed to raise a floating body for a spar-type offshore wind power generation facility from a floating sideways position to an upright position by injecting ballast water at sea, including

- a first step of decentering a center of gravity of the floating body for the spar-type offshore wind power generation facility by means of a center-of-gravity decentering means,
- a second step of injecting the ballast water to start to raise the floating body for the spar-type offshore wind power generation facility toward the upright position, and subsequently stopping the injection of the ballast water at a predetermined amount so as to stop the floating body for the spar-type offshore wind power generation facility in an inclined state before standing upright, and
- a third step of gradually re-injecting the ballast water to raise the floating body for the spar-type offshore wind power generation facility to the upright position.

The second aspect of the invention is a second embodied raising method according to the present invention. Specifically, the floating body is raised upright by beforehand decentering the center of gravity of the floating body for the spar-type offshore wind power generation facility by means of the center-of-gravity decentering means, in the first step. The beforehand decentering of the center of gravity slows the rising motion to which the floating body is shifted from the state of floating sideways by injecting the ballast water, in the second step.

In the second step, the floating body for the spar-type offshore wind power generation facility starts the rising motion in response to the injection of the ballast water, and thereafter the injection of the ballast water is stopped at a predetermined amount so that the floating body for the spar-type offshore wind power generation facility is stopped in an inclined state before standing upright. In the second step, since the rising motion is slowed due to the beforehand decentering of the center of gravity, the floating body is easily stopped in an inclined state before the reaching the upright position by stopping the injection of the ballast water at a predetermined amount.

In the last third step, the floating body for the spar-type offshore wind power generation facility is raised to the upright position by gradually re-injecting the ballast water. In the case where the floating body is raised to the upright position from the state being stopped at an inclined angle, the swaying just after reaching the upright position is mostly prevented because the inertial force acts only slightly on the floating body.

Accordingly, the present invention enables to safely and efficiently raise the floating body for the spar-type offshore wind power generation facility upright by injecting the ballast water at sea.

In a third aspect of the invention, in the method for raising the floating body for the spar-type offshore wind power generation facility according to the first or second aspects of the invention, the center-of-gravity decentering means is a weight detachably attached to an outer surface of the floating body for the spar-type offshore wind power generation facility.

The third aspect of the invention corresponds to a first embodiment of the center-of-gravity decentering means. Specifically, the weight detachably attached to the outer surface of the floating body for the spar-type offshore wind power generation facility serves as the center-of-gravity decentering means.

In a fourth aspect of the invention, in the method for raising the floating body for the spar-type offshore wind power generation facility according to the third aspect of the invention, the weight is attached at a position above the sea surface at a time of raising to the upright position.

In the fourth aspect of the invention, the weight is attached at a position above the sea surface at a time of raising to the upright position. After the floating body is raised to the upright position, the weight is easily removed when it is no longer needed.

In a fifth aspect of the invention, in the method for raising the floating body for the spar-type offshore wind power generation facility according to the first or second aspects of the invention, the center-of-gravity decentering means is a solid ballast introduced in the floating body for the spar-type offshore wind power generation facility.

The fifth aspect of the invention corresponds to a second embodiment of the center-of-gravity decentering means. Specifically, the solid ballast introduced in the floating body for the spar-type offshore wind power generation facility serves as the center-of-gravity decentering means. The solid ballast is generally introduced into the floating body after being raised to the upright position. The solid ballast may be used as the means of decentering the center of gravity because it remains, unlike water, in an uneven state without moving until an inclination angle corresponds to an angle of rest (the slope angle at which the solid ballast remains stable without collapsing). Moreover, the solid ballast may be used as the center-of-gravity decentering means because the solid ballast after exceeding the angle of rest moves more slowly than water, and the decentered state is maintained while the eccentricity is gradually decreased until just before the upright state.

Advantageous Effects of Invention

As described in detail above, the present invention enables to safely and efficiently raise the floating body for the spar-type offshore wind power generation facility by injecting the ballast water at sea.

BRIEF DESCRIPTION OF DRAWINGS

FIG. 1 is an overall side view of a spar-type floating offshore wind power generation facility 1.

FIG. 2 is a longitudinal sectional view of a floating body 4.

FIG. 3 illustrates a precast cylindrical body 15, where FIG. 3(A) is a longitudinal sectional view thereof, FIG. 3(B) is a plan view thereof (view along a B-B line), and FIG. 3(C) is a bottom view thereof (view along a C-C line).

FIG. 4(A) and FIG. 4(B) illustrate the procedure of tightly connecting the precast cylindrical bodies 15 with each other.

FIG. 5 is a longitudinal sectional view illustrating the boundary between a lower concrete floating structure 4A and an upper steel floating structure 4B.

FIG. 6 illustrates the method for raising the floating body 4 upright according to a first embodiment, in Part 1.

FIG. 7 illustrates the method for raising the floating body 4 upright according to the first embodiment, in Part 2.

FIG. 8 illustrates the method for raising the floating body 4 upright according to the first embodiment, in Part 3.

FIG. 9 illustrates the method for raising the floating body 4 upright according to the first embodiment, in Part 4.

FIG. 10 illustrates the method for constructing the offshore wind power generation facility 1 after the raising, in Part 1.

FIG. 11 illustrates the method for constructing the offshore wind power generation facility 1 after the raising, in Part 2.

FIG. 12 illustrates the method for raising the floating body 4 upright according to a second embodiment, in Part 1.

FIG. 13 illustrates the method for raising the floating body 4 upright according to the second embodiment, in Part 2.

FIG. 14 illustrates the method for raising the floating body 4 upright according to the second embodiment, in Part 3.

FIG. 15 illustrates the method for raising the floating body 4 upright according to the second embodiment, in Part 4.

FIG. 16 is a side view of a floating model 40.

FIG. 17 is a graph showing comparison between experimental values and analysis results.

FIG. 18 is a graph showing effects of eccentricity of center-of-gravity of a floating body on response (rising motion).

DESCRIPTION OF EMBODIMENTS

Hereinafter, the embodiments of the present invention will be described in detail with reference to the drawings.

[Spar-Type Floating Offshore Wind Power Generation Facility 1]

Prior to describing the "method for raising a floating body for a spar-type offshore wind power generation facility" according to the present invention, a structural example of the spar-type floating offshore wind power generation facility 1 will be described in detail, with reference to FIG. 1 to FIG. 5.

As shown in FIG. 1, the offshore wind power generation facility 1 is configured with the cylindrical-shaped floating body 4, a mooring cable 5, a tower 6, and a wind turbine 7 configured with a nacelle 8 installed at the top of the tower 6 and a plurality of blades 9, 9 . . . .

As shown in FIG. 2, the floating body 4 is configured with the lower concrete floating structure 4A, which is formed by stacking the plurality of precast cylindrical bodies 15, 15 . . . in the height direction and tightly connecting and integrating the precast cylindrical bodies 15, 15 . . . with PC steel members 19, and the upper steel floating structure 4B connected above the lower concrete floating structure 4A.

The floating body 4 has a hollow portion which allows ballast material such as water, gravel, fine aggregate or coarse aggregate, or metal particles to be introduced into or discharged from, so that its buoyancy (draft) is adjustable. The fluid transport method having been proposed by the present applicant in Japanese patent application publication No. 2012-201217 allows such ballast material to be introduced or discharged.

As shown in FIG. 3, the precast cylindrical bodies 15 included in the lower concrete floating structure 4A are the circular cylindrical precast members having the uniform cross section in the axial direction. The hollow precast members manufactured either by using the same mold or by centrifugal molding are used as the precast cylindrical bodies 15.

The wall of the precast cylindrical body 15 includes, inside the wall surface, not only a reinforcing bar 20, but also sheaths 21, 21 . . . , which are arranged at appropriate intervals in the circumferential direction and allow for insertion of the PC steel bars 19. Each of the sheaths 21, 21 . . . has a sheath expansion part 21*a* allowing for insertion of a coupler for coupling the PC steel bars 19 to each other, at the bottom part, and has a void space part 22 for fitting a fixing anchor plate, at the upper part. The precast cylindrical body 15 further has a plurality of hanging brackets 23 on the upper surface.

As shown in FIG. 4(A), the precast cylindrical bodies 15 are tightly connected by the steps of stacking the precast cylindrical bodies 15, 15 while inserting the PC steel bars 19, 19 . . . extended upwards from the lower precast cylindrical body 15 into the sheaths 21, 21 . . . , inserting anchor plates 24 into the void space parts 22, and introducing tension to the PC steel bars 19 by means of nut members 25 to integrate them. Grout material is injected into the sheaths 21 through grout injection holes 27 (refer to FIG. 4(B)). Each of the anchor plates 24 has a hole 24*a* serving as a grout injection confirmation hole. The filling of the grout material is completed when the grout material is discharged from the confirmation hole.

As shown in FIG. 4(B), the tight connection is further performed by the steps of, after screwing couplers 26 to the protrusions of the PC steel bars 19 to connect them to the upper PC steel bars 19, 19 . . . , inserting the PC steel bars 19, 19 . . . into the sheaths 21, 21 . . . of the upper precast cylindrical body 15, for stacking. The steps above for fixing the PC steel bars 19 according to the procedure above are sequentially repeated to achieve the stacking in the height direction. At this time, an adhesive 28 such as epoxy resin or sealing material is applied to the joint surfaces between the lower precast cylindrical body 15 and the upper precast cylindrical body 15, to ensure water cutoff performance and join the joint surfaces.

As shown in FIG. 2, the upper steel floating structure 4B is configured with a steel cylindrical body 17 positioned on the relatively lower side and a steel cylindrical body 18 positioned on the relatively upper side. The lower steel cylindrical body 17 has the lower portion having the same outer diameter as the precast cylindrical body 15, and is connected to the precast cylindrical body 15. The steel cylindrical body 17 has the upper portion formed in a truncated conical frustum gradually narrowing in diameter.

The upper steel cylindrical body 18 is a cylindrical body having the outer diameter which is continuous from the upper outer diameter of the lower steel cylindrical body 17, and is connected to the lower steel cylindrical body 17 by bolting, welding, or the like (connection by bolting in the illustrated example).

The tower 6 made of steel, concrete, or prestressed reinforced concrete (PRC) is used. The tower 6 made of steel is preferable because it is light in total weight. The outer diameter of the tower 6 and the outer diameter of the upper steel cylindrical body 18 are substantially the same, and those outer shapes are continuous in the vertical direction without any steps or the like. In the illustrated example, a ladder 13 is provided on the upper part of the upper steel cylindrical body 18, and a walkway scaffold 14 is provided in the circumferential direction substantially at the boundary between the tower 6 and the upper steel cylindrical body 18.

As shown in FIG. 1, a mooring point K at which the floating body 4 is moored by the mooring cable 5 is set at a position below the sea surface and higher than a center of gravity G of the floating body 4. This prevents a vessel from coming into contact with the mooring cable 5. Furthermore, this generates a resistance moment centered around the center of gravity G of the floating body 4 at the mooring point, thereby preventing the floating body 4 from inclining excessively, and appropriately maintaining the tower 6 in an inclined state.

The nacelle 8 is a device equipped with a generator which converts the rotation of the wind turbine 7 into electricity, a controller which is capable of automatically changing the angle of the blade 9, and the like.

[Method for Raising Floating Body for Spar-Type Offshore Wind Power Generation Facility (Part 1)]

The method for raising the floating body 4 for the spar-type offshore wind power generation facility described above will be described in detail below.

In the present invention, a floating body for a spar-type offshore wind power generation facility floating sideways is raised upright by injecting ballast water at sea, by a first step of decentering the center of gravity of the floating body 4 for the spar-type offshore wind power generation facility by detachably attaching a weight 2 thereto, and a second step of injecting ballast water to raise the floating body 4 for the spar-type floating offshore wind power generation facility upright. The weight 2 is included in the "center-of-gravity decentering means" according to the present invention. Hereinafter, the configuration will be specifically described in detail with reference to FIG. 6 to FIG. 10.

When the floating body 4 is manufactured in a predetermined quay area, the floating body 4 is loaded on a semi-submersible barge 30 while adjusting ballast. At this time, the weight 2 for decentering the center of gravity of the floating body 4 is attached detachably to the floating body 4. For the convenience of detaching, it is desirable that the weight 2 is attached to the outer surface of the floating body 4 at a position above the sea surface when the floating body 4 is raised upright. The decentering of the center of gravity herein means the shift of the center of gravity of the floating body 4 in not only the direction along the longitudinal central axis of the floating body 4 (Z axis) but also the plane direction perpendicular to the longitudinal central axis of the floating body 4 (X-Y plane). Accordingly, the weight 2 may be provided at one position on the outer surface of the floating body 4, and it is not desirable that the weight 2 is provided at even number of symmetrical positions on the outer surface of the floating body 4 (for example, positions at 180 degrees or at 90 degrees).

As shown in FIG. 6, a tugboat 31 performs towing to an offshore installation site. The floating body 4 is floated off (floating and launching) by injecting water into the semi-submersible barge 30 to be semi-submerged, floating the floating body 4 at sea, and separating the semi-submersible barge 30 from the floating body 4.

As shown in FIG. 7, a ballast barge 32 equipped with a ballast water pumping facility is brought close to the floating body 4 having been floated off, so as to allow for water injection, and a ballast hose 33 is inserted into the floating body 4 to supply ballast water.

When a predetermined amount of ballast water is injected into the floating body 4, the pitch angle of the floating body 4 (an inclination angle θ formed between the longitudinal axis of the floating body 4 and the water surface) increases gradually but surely, at first. As shown in FIG. 8, at a certain point, the floating body 4 starts a rapid rising motion. Then, as shown in FIG. 9, the floating body 4 is raised substantially vertically.

In the present invention, as in the Example to be described later, the beforehand decentering of the center of gravity of the floating body 4 for the spar-type offshore wind power generation facility by means of the waist 2 attached slows the rising motion to which the floating body is shifted from the state of floating sideways by injecting the ballast water, and further reduces swaying in size of the floating body after becoming close to the upright state. Accordingly, the floating body 4 is safely and efficiently raised upright by injecting the ballast water.

After the floating body 4 is raised upright, the weight 2 is removed as shown in FIG. 10. A solid ballast 34 is introduced into the floating body 4. The solid ballast 34 is a granular substance having higher specific gravity than water, and is preferably one or combination of a plurality of minerals including sand, gravel, and barite, and metals including iron, and lead in power or granular form. Adjusting the material of the solid ballast 34 allows for introduction of appropriate specific gravity. The draft of the floating body 4 is adjusted while balancing with the ballast water.

As shown in FIG. 10, the ladder 13 is attached on the upper part of the floating body 4, and the walkway scaffold 14 is provided. One end of the mooring cable 5 is securely connected to the floating body 4, and the other end is securely connected to the anchor submerged in the seabed to stabilize the floating body 4.

As shown in FIG. 11, the tower 6, and the wind turbine 7 connected to the top of the tower 6, including the nacelle 8 and the plurality of blades 9, 9 . . . are collectively installed on the upper part of the floating body 4 while being suspended by the crane installed on a heavy lift vessel 35.

[Method for raising floating body for spar-type offshore wind power generation facility (Part 2)]

The second embodiment of the method for raising the floating body 4 for the spar-type offshore wind power generation facility will be described in detail below.

In the present second embodiment, the floating body 4 for the spar-type offshore wind power generation facility floating sideways is raised upright by injecting ballast water at sea, by

- a first step of decentering the center of gravity of the floating body 4 for the spar-type floating offshore wind power generation facility by means of the center-of-gravity decentering means,
- a second step of injecting ballast water to start to raise the floating body 4 for the spar-type floating offshore wind power generation facility upright, and subsequently stopping the injection of the ballast water at a predetermined amount so as to stop the floating body 4 in an inclined state before the standing upright, and
- a third step of gradually re-injecting the ballast water to raise the floating body 4 for the spar-type offshore wind power generation facility upright.

In comparison with the "method for raising floating body (Part 1)" described above, the present method is different only in that, in the middle of the rapid rising motion of the floating body 4 after its start, the ballast water injection is stopped so as to stop the floating body 4 in an inclined state before standing upright.

As described above, as the center of gravity decentering means, the weight 2 may be attached, or the solid ballast 34 may be introduced into the floating body 4. The beforehand decentering of the center of gravity slows the rising motion, thereby allowing the floating body 4 to be stopped in an inclined state before standing upright. In the third step, the ballast water is gradually re-injected into the floating body 4 having been temporarily stopped in an inclined state, so as to raise the floating body 4 upright. This allows for safer and more efficient operation because the inertial force occurring when the floating body 4 is raised upright only slightly makes the floating body 4 sway.

In the case of the solid ballast 34 to be described later serving as the center-of-gravity decentering means, the inclination angle θ at which the floating body 4 is stopped in an inclined state before standing upright is preferably an angle equal to or less than the angle of rest of the solid ballast 34.

[Second Embodiment of Center-of-Gravity Decentering Means]

In the embodiment described above, the weight 2 serves as the center-of-gravity decentering means. Alternatively, the solid ballast 34 may serve as the center-of-gravity decentering means. The case will be described in detail with reference to FIG. 12 to FIG. 15.

As shown in FIG. 12, when the floating body 4 is manufactured in a predetermined quay area, the floating body is loaded on the semi-submersible barge 30 while adjusting ballast. The solid ballast 34 is then introduced into the loaded floating body 4. Alternatively, the solid ballast 34 may be introduced prior to the loading on the semi-submersible barge 30. The solid ballast 34 is in a flowable state without being held by any means. Therefore, since the floating body 4 is loaded sideways on the semi-submersible barge 30, the solid ballast 34 spreads horizontally. In other words, in the floating body 4 positioned sideways, the center of gravity of the floating body 4 is decentered by the solid ballast 34.

As shown in FIG. 12, after being towed by the tugboat 31 to an offshore installation site, the floating body 4 is floated at sea. The floating body 4 is floated off (floating and launching) by injecting water into the semi-submersible barge 30 to be semi-submerged, floating the floating body 4 at sea, and separating the semi-submersible barge 30 from the floating body 4.

As shown in FIG. 14, the ballast barge 32 equipped with a ballast water pumping facility is brought close to the floating body 4 having been floated off, so as to allow for water injection, and the ballast hose 33 is inserted inside the floating body 4 to supply ballast water.

When a predetermined amount of ballast water is injected into the floating body 4, the pitch angle of the floating body 4 (the angle θ formed between the longitudinal line of the floating body and the water surface) increases gradually but surely, at first. As shown in FIG. 14, at a certain point, the floating body 4 starts a rapid rising motion. Then, as shown in FIG. 15, the floating body 4 is raised substantially vertically.

In the floating body 4 positioned sideways, the center of gravity of the floating body 4 is decentered by the solid ballast introduced inside. The pitch angle θ of the floating body 4 gradually increases as the ballast water is injected. Even when the floating body 4 is inclined, the solid ballast 34 remains in an uneven state without moving until the inclination angle θ corresponds to the angle of rest (the slope angle at which the solid ballast 34 remains stable without collapsing). When the inclination angle θ of the floating body 4 exceeds the angle of rest, the solid ballast 34 starts to move. Due to its slow moving-speed compared to water, the solid ballast 34 flows gradually while taking time until the upright state, and finally the bottom part of the floating body 4 is filled with the solid ballast 34. This releases the decentering of the center of gravity. Since the decentered state is maintained while the eccentricity is gradually decreased until just before the upright state, the rising motion of the floating body 4 is slow, and the swaying after becoming close to the upright state is reduced. Accordingly, the floating body 4 is safely and efficiently raised by injecting the ballast water.

After the floating body 4 is raised upright, the draft of the floating body 4, in which a predetermined amount of the solid ballast 34 has already been introduced, is adjusted by injecting the ballast water.

The following procedure for constructing the offshore wind power generation facility 1 after the raising upright is omitted because it has already been described in the first embodiment.

OTHER EMBODIMENTS

1: The two means serving as the center-of-gravity decentering means have been described: one using the weight 2 attached to the outer surface of the floating body 4; and the other introducing the solid ballast 34 into the floating body 4. The two means may be used in combination. The pre-introduction of the solid ballast 34 in the floating body 4 eliminates the needs of introduction of the solid ballast offshore, and leads to more efficient work.

Example

In the present invention, experiments and analyses were conducted to verify the effects of decentering the center of gravity of the floating body 4 by means of the center-of-gravity decentering means (the weight 2 or the solid ballast 34), and those will be described in detail below.

1. Experiment in Water Tank

1.1 Model Specifications

FIG. 16 and Table 1 show the overview and dimensions of the floating model 40. The model is scaled down to 1/36.11 of the assumed body (2 MW generator). The model was made mainly with polyvinyl chloride pipes, and was adjusted in weight and center-of-gravity height by attaching iron plates to the upper part and the lower part of the floating body. As shown in FIG. 16, markers 41, 42 for use in measuring swaying were respectively attached at two positions, 65 mm and 418 mm away from the upper end of the floating body.

TABLE 1

| | | |
|---|---|---|
| Upper part | Length | 448 mm |
| | Outer diameter | 132.9 mm |
| Conical part | Length | 166.2 mm |
| | Outer diameter | 132.9 to 216 mm |
| Lower part | Length | 1861.5 mm |
| | Outer diameter | 216 mm |
| | Wall thickness | 11 mm |
| | Bottom thickness | 91 mm |
| Total weight | 46.25 kg | |
| Center-of-gravity | Position of 788 mm away from bottom of floating body | |

1.2 Measurement Method

The experiment in water tank was conducted in a test tank (width: 24.4 m, length: 38.8 m, depth during experiment: 1.824 m).

The floating model 40 was moored at the center of the water tank. The upper part of the floating body was moored from an auxiliary water tank cart, and the lower part was moored from one side of the water tank. The mooring was adjusted in advance so that the behavior of the floating model 40 is not hindered by the mooring force.

The floating model 40 was subjected to attitude measurement using the motion capture system (Qualysis) capable of capturing real time motions of the makers 41, 42. The four cameras (Qualysis 5+; 4 MP, 2048×2048 pixels, 180 fps) installed beside the water tank captured the motions of the two markers 41, 42 attached to the floating model 40, and output data as spatial coordinate values every 0.02 seconds (50 Hz). The inclination angle formed between the central axis of the floating body and the water surface was calculated based on the converted coordinate values, and was referred to as a pitch angle.

1.3 Injection of Ballast Water

The ballast water was injected first into the upper part of the floating body through a hose. The pump used was Smoothflow Pump made by Tacmina (maximum discharge rate: 1.08 L/min, maximum discharge pressure: 1 MPa). The flow rate during the experiment was set at 0.73 L/min (equivalent to 5.7 $m^3$/min in the actual body).

2. Analysis Method

The analysis was conducted by using a program (ADAMS: mechanical analysis software) to obtain the attitude of the floating body in the state of having arbitrary ballast water therein, by taking into account six forces: gravity acting on the floating body itself; gravity acting on the internal ballast water; gravity acting on the weight for decentering center-of-gravity; buoyancy acting on the floating body; and additional mass force and resistance force received by the moving floating body from external fluid, on the basis of the dynamic equilibrium conditions between the six forces and the inertial force occurring when the floating body moves.

3. Experiment and Analysis Results

3.1 Comparison of Experimental Values and Analysis Results (in Upright Raising)

FIG. 17 shows the comparison between the experimental results in the upright raising and the simulation analysis results by means of ADAMS. In this case, the coordinates of the center of gravity of the floating body itself free from ballast water were set at (Xg, Yg, Zg)=(0.0022 m, 0.0 m, 0.788 m) with respect to a floating body fixed coordinate system. In the floating body fixed coordinate system, the origin is set on the bottom surface of the floating body, the upward Z-axis is set along the central axis of the floating body, and the X and Y axes are set to be perpendicular to the Z-axis.

FIG. 17 shows that the simulation analysis results by means of ADAMS successfully simulate the experimental results (Experiment No. 1).

3.2 Effects of Decentering Center of Gravity of Floating Body on Response (in Upright Raising)

Since, according to 3.1, the response of the floating body in the upright raising was accurately predicted through the simulation by means of ADAMS, the effects of decentering the center of gravity of the floating body on the response are investigated through the simulation. The response of the floating body in the upright raising was simulated with respect to the following three cases with the values of Xg varied: the case of no eccentricity where Xg=0.0 m; the case of the weight attached in the same conditions as the experimental conditions where Xg=0.0022 m; and the case of the doubled eccentricity of the center of gravity where Xg=0.0044 m. FIG. 18 shows the results.

FIG. 18 shows that, in the case of no eccentricity where Xg=0.0 m, the rising motion was rapid, and large swaying occurred after the upright state. In the case of the eccentricity of the center of gravity where Xg=0.0022 m, and in the case of the doubled eccentricity of the center of gravity, the rising motion was slow, and only small swaying occurred even after becoming close to the upright state. The comparison between the case of the eccentricity of the center of gravity where Xg=0.0022 m and the case of the doubled eccentricity of the center of gravity where Xg=0.0044 m shows that as the eccentricity is increased, the rising motion is slower, and the swaying after the standing upright is reduced.

Based on the results above, it is found that in raising the floating body upright by injecting water, the decentering of the center of gravity leads to slower rising motion, and reduces swaying after the standing upright.

REFERENCE SIGNS LIST

1: SPAR-TYPE FLOATING OFFSHORE WIND POWER GENERATION FACILITY, 4: FLOATING BODY, 4A: LOWER CONCRETE FLOATING STRUCTURE, 4B: UPPER STEEL FLOATING STRUCTURE, 5: MOORING CABLE, 6: TOWER, 7, (7'): WIND TURBINE, 8: NACELLE, 9: BLADE, 15: PRECAST CYLINDRICAL BODY, 17, 18: STEEL CYLINDRICAL BODY, 19: PC STEEL BAR, 30: SEMI-SUBMERSIBLE BARGE, 31: TUGBOAT, 32: BALLAST BARGE, 33: BALLAST HOSE, 34: SOLID BALLAST, 35: HEAVY LIFT VESSEL, 40: FLOATING MODEL, 41, 42: MARKER

The invention claimed is:

1. A method for raising a floating body for a spar-type offshore wind power generation facility to be performed to raise the floating body for the spar-type offshore wind power generation facility from a floating sideways position to an upright position by injecting ballast water at sea, the method comprising:

decentering a center of gravity of the floating body for the spar-type offshore wind power generation facility by means of a center-of-gravity decentering means; and after the decentering of the center of gravity, injecting ballast water to raise the floating body for the spar-type offshore wind power generation facility from the floating sideways position to the upright position, wherein the center-of-gravity decentering means is a weight detachably attached to an outer surface of the floating body for the spar-type offshore wind power generation facility, and the weight is attached so as to be above a surface of the sea in the upright position of the floating body for the spar-type offshore wind power generation facility.

2. A method for raising a floating body for a spar-type offshore wind power generation facility to be performed to raise the floating body the spar-type offshore wind power generation facility from a floating sideways position to an upright position by injecting ballast water at sea, the method comprising:

decentering a center of gravity of the floating body for the spar-type offshore wind power generation facility by means of a center-of-gravity decentering means;

after the decentering of the center of gravity, injecting ballast water to start to raise the floating body for the spar-type offshore wind power generation facility from the floating sideways position toward the upright position, and subsequently stopping the injection of the ballast water at a predetermined amount so as to stop the floating body for the spar-type offshore wind power generation facility in an inclined state before reaching the upright position; and after the stopping of the injection of the ballast water, gradually re-injecting the ballast water to raise the floating body for the spar-type offshore wind power generation facility to the upright position, wherein the center-of-gravity decentering means is a weight detachably attached to an outer surface of the floating body for the spar-type offshore wind power generation facility, and the weight is attached so as to be above a surface of the sea in the upright position of the floating body for the spar-type offshore wind power generation facility.

* * * * *